United States Patent

Takai et al.

[11] Patent Number: 5,874,965
[45] Date of Patent: Feb. 23, 1999

[54] METHOD FOR MAGNIFYING A PLURALITY OF DISPLAY IMAGES TO REVEAL MORE DETAILED INFORMATION

[75] Inventors: Yasuyuki Takai, Shiki-gun; Junko Nakagawa, Higashiosaka, both of Japan

[73] Assignee: Sharp Kabushiki Kaisha, Osaka, Japan

[21] Appl. No.: 729,018

[22] Filed: Oct. 10, 1996

[30] Foreign Application Priority Data

Oct. 11, 1995 [JP] Japan .................................. 7-263379

[51] Int. Cl.⁶ .............................. G06F 3/14; G06F 3/00
[52] U.S. Cl. ..................... 345/357; 345/339; 345/127; 345/963
[58] Field of Search .................................. 345/127, 130, 345/163, 156, 340, 357, 356

[56] References Cited

U.S. PATENT DOCUMENTS

| | | | |
|---|---|---|---|
| 5,365,360 | 11/1994 | Torres | 345/348 |
| 5,638,523 | 6/1997 | Mullet et al. | 345/326 |
| 5,659,768 | 8/1997 | Forbes et al. | 707/517 |
| 5,664,175 | 9/1997 | Jackson et al. | 707/7 |
| 5,781,195 | 7/1998 | Marvin | 345/428 |
| 5,790,121 | 8/1998 | Sklar et al. | 345/356 |

FOREIGN PATENT DOCUMENTS 6-110941  4/1994  Japan .

Primary Examiner—Raymond J. Bayerl
Assistant Examiner—Chadwick A. Jackson
Attorney, Agent, or Firm—Nixon & Vanderhye, P.C.

[57] ABSTRACT

According to the present invention, a method for displaying a plurality of display images in a display window, which are stored in a plurality of software objects is provided. The method includes: a first step of selectively displaying a first display image in a first region within the display window; and a second step of selectively displaying a second display image in a second region within the display window. In this method, the second step includes the steps of: indicating a point within the displayed first display image by using an image indicator; changing a magnification power at which the first display image is displayed by moving the image indicator within the first display image, thereby changing sizes of the first and second regions; and displaying the second display image when the size of the second region has reached a predetermined size. The second region is determined based on a relationship between the first and second display images. The relationship between the first and second display images is previously recorded in a software object corresponding to the first display image or the second display image.

28 Claims, 15 Drawing Sheets

| | AUGUST | | | | | | |
|---|---|---|---|---|---|---|---|
| 1 | 2 | 3 | 4 | 5 | 6 | 7 | 8 |
| Tues. | Wed. | Thur. | Fri. | Sat. | Sun. | Mon. | Tues. |
| | Project C | | Project D | | | | |
| | | | | 9:00 Section meeting | | | |
| | | | | 10:00 Sale conference | | | |
| Patent promotion conference | | | | sale conference 13:00 Production conference | | | |
| | | | | production conference 15:00 Meeting Mr. A | | | |

FIG. 3

|   | 1 | 2 | 3 | 4 | 5 | 6 | 7 | 8 |
|---|---|---|---|---|---|---|---|---|
|   | Tues. | Wed. | Thur. | Fri. | Sat. | Sun. | Mon. | Tues. |
|   |   | Project C |   | Project D | 9:00 Section meeting<br>10:00 Sale conference |   |   |   |
|   | Patent promotion conference |   |   |   | 13:00 Production conference<br>15:00 Meeting Mr. A |   |   |   |

AUGUST sale conference
production conference

Production conference
Date & Time: 13:00, August 5
Place of meeting: Meeting room 101
Attendees: Hayakawa Taro
 Matsushita Jiro
 Kimura Saburo *
Name of Machine: PCP

FIG. 4

FIG. 9A
Project data

| A | Data attribute |
|---|---|
| Project data No. | 000 to 999 (e.g. 003) |
| Name of project | Area to be filled in with name (e.g. Project D) |
| Start date (e.g. 062095) | |
| End date (e.g. 082095) | |

FIG. 9B
Event schedule data

| | | | Data attribute |
|---|---|---|---|
| | B | | Data attribute |
| | Date | | (e.g. 080595) |
| | 001 | | Event schedule data No. : 001 to 999 |
| A | Project data No. (e.g. Blank) | | Data number of project data; if there is no associated data, nothing is to be filled in. |
| | Event data No. | | Number of associated event data |
| | Importance N | | Representing importance of event |
| | 003 | | Event schedule data No. |
| | Project data No. | | (e.g. 003) |
| | Event data No. | | (e.g. 001) |
| | Importance N | | Representing importance of event |

To be continued

FIG. 9C
Event data

| | | |
|---|---|---|
| | C | Data attribute |
| A | Number of event data | 0000 to 9999 (e.g. 0003) |
| | Kind of event data | Conference(1) · Appointment(2) (e.g. 1) |

| | | |
|---|---|---|
| | Start time | Start time of event (e.g. 13:00) |
| | Name of event | Name of event to be held (e.g. Production conference) |
| | Place information | (e.g. Meeting room 101) |
| B | Attendee information: Name / Code | (e.g. Hayakawa Taro / 0001) |
| | Subject matter information | (e.g. PCP) Describing subject matter |
| | Attribute of associated data | Displaying attribute of associated data (e.g. Production management(E)) |
| C | ID code of associated data | |

FIG. 10A
Personal information management data

Personal information management databese consists of the following data

| D | Data attribute |
|---|---|
| Code | (e.g. 0001) |
| Name | (e.g. Hayakawa Taro) |
| Section | (e.g. xxx, Corp. Production sec.) |
| Post | (e.g. Chief of section) |
| Age | (e.g. 51) |
| Note | (e.g. Joined in 1970) |

B = the table above

FIG. 10B
Production management data

Production management databese consists of the following data

| E | Data attribute |
|---|---|
| ID code | ID code of machine PCP (e.g. 0005) |
| Name of machine | (e.g. PCP) |
| Production start month | (e.g. 0995) |
| Total production number | |
| Production number of this month | |
| Total production number of next month | |
| Total production number of the month after next | |

C = the table above

METHOD FOR MAGNIFYING A PLURALITY OF DISPLAY IMAGES TO REVEAL MORE DETAILED INFORMATION

BACKGROUND OF THE INVENTION

1. Field of the Invention

The present invention relates to a method for searching for and displaying a software object retained in a computer system. In this specification, a "software object" includes all the objects, the access to which is controlled in a computer system, such as a file, a program, an area in a main storage, application software, a document or an image. Simply speaking, a "software object" contains a data set which can be called by a single name and can include data such as an image or text and an operation and an application which are implemented as application software.

2. Description of the Related Art

Various kinds of data search methods have been proposed for accessing and displaying a software object retained in a computer system. For example, in Japanese Laid-Open Patent Publication No. 6-110941, a system for combining map data with data about the customers living in a section (or a district) represented by the map data and simultaneously outputting these data on a display screen of a map data processing system functioning as a data search system is disclosed.

In the system disclosed in the patent publication, when an operator selects one of a plurality of supply conduits within a map displayed on the display screen, a customer's number corresponding to the supply conduit number of the selected supply conduit is searched for in response to the selection operation. When the customer's data associated with the customer's number is found, both the map in the vicinity of the supply conduit and the customer's data are displayed. Thus, in order to retrieve, on a display screen, other information associated with the information which has already been displayed as an image through a conventional data search system, an operator is required to specify information to be retrieved by selecting a point or an area within the image which has already been displayed on the display screen and then to search for the specified information on the display screen.

However, in order to retrieve information other than the information displayed in the above-described manner through such a data search system, an operator is required to perform an operation for specifying each item of information to be retrieved, for example, by selecting a point or an area within the displayed image. Therefore, if the operator tries to sequentially retrieve a plurality of mutually associated information items existing in storage media through such a data search system, such a specification operation must be performed for retrieving a single information item and a plurality of mutually associated information items cannot be retrieved successively.

SUMMARY OF THE INVENTION

According to the present invention, a method for displaying a plurality of display images, which are stored in a plurality of software objects, within a display window of an information processing apparatus in which the plurality of software objects are stored, is provided. The method includes: a first step of selectively displaying a first display image from the plurality of display images in a first region within the display window; and a second step of selectively displaying a second display image from the plurality of display images in a second region within the display window. In this method, the second step includes the steps of: indicating a point within the displayed first display image by using an image indicator indicating a point within the display window; changing a magnification power at which the first display image is displayed by moving the image indicator from the indicated point within the first display image, thereby changing sizes of the first region and the second region; and displaying the second display image when the size of the second region has increased to reach a predetermined size, and the second region is a region to be determined based on a relationship between the first display image and the second display image and the relationship between the first display image and the second display image is previously recorded in a software object corresponding to the first display image or the second display image.

In one embodiment, the method further includes a step of erasing the second display image when the size of the second region has decreased to reach a predetermined size.

In another embodiment, the information processing apparatus further stores a flag representing an importance of each of the plurality of display images therein, and the step of displaying the second display image further includes the steps of: making a reference to the flags of display images which are not displayed within the display window among the plurality of display images; and selecting a display image having a higher importance from the display images which are not displayed by giving a priority to the display image over the other display images having a lower importance based on a result of the reference.

In still another embodiment, the first display image is a representation representing a time period and including a plurality of representations, each representing a time, and the second display image is a representation representing an event during the time period represented by the first display image, and the step of displaying the second display image further includes a step of searching for the second display image among the plurality of display images.

In still another embodiment, the step of displaying the second display image further includes a step of simultaneously displaying both the first display image and the second display image within the display window.

In still another embodiment, each of the plurality of display images is recorded in a software object corresponding thereto, and the step of displaying the second display image further includes the steps of: searching for the second display image among all the display images recorded in a software object corresponding to the first display image; and searching for the second display image among the display images recorded in another software object when the second display image is not recorded in the software object corresponding to the first display image.

In still another embodiment, the information processing apparatus is connected to another information processing apparatus in which another plurality of software objects are stored, and the step of displaying the second display image further includes the steps of: searching for the second display image among the display images corresponding to the another plurality of software objects stored in the another information processing apparatus when the second display image is not recorded in any of the plurality of software objects stored in the information processing apparatus; and transferring the second display image from the another information processing apparatus to the information processing apparatus.

In still another embodiment, the image indicator is moved by a pointing device.

In still another embodiment, the method further includes a step of displaying a third display image when the size of the second region has been further increased to be M times as large as the predetermined size.

In still another embodiment, the first region is further divided into a plurality of sub-regions, and the step of changing the sizes of the first region and the second region includes a step of determining the respective sizes of the plurality of sub-regions such that a size of a sub-region including the point indicated by the image indicator is larger than sizes of adjacent subregions among the plurality of sub-regions.

Thus, the invention described herein makes possible the advantage of providing a method for displaying a plurality of display images within a display window of an information processing apparatus in which a plurality of mutually associated information items can be successively retrieved as display images.

This and other advantages of the present invention will become apparent to those skilled in the art upon reading and understanding the following detailed description with reference to the accompanying figures.

BRIEF DESCRIPTION OF THE DRAWINGS

FIG. 3 illustrates an exemplary display image when an image displayed within the display window as shown in FIG. 2 has been enlarged.

FIG. 4 illustrates exemplary display images when an image displayed within the display window as shown in FIG. 3 has been enlarged.

FIGS. 9A to 9C illustrate exemplary structures of the data retained in the information processing apparatus: FIG. 9A illustrates the structure of project data; FIG. 9B illustrates the structure of event schedule data; and FIG. 9C illustrates the structure of event data.

FIGS. 10A and 10B illustrate exemplary data structures: FIG. 10A illustrates the structure of personal information management data while FIG. 10B illustrates the structure of production management information data.

DESCRIPTION OF THE PREFERRED EMBODIMENTS

Hereinafter, the data display/search method according to the present invention will be described.

Figure 13:
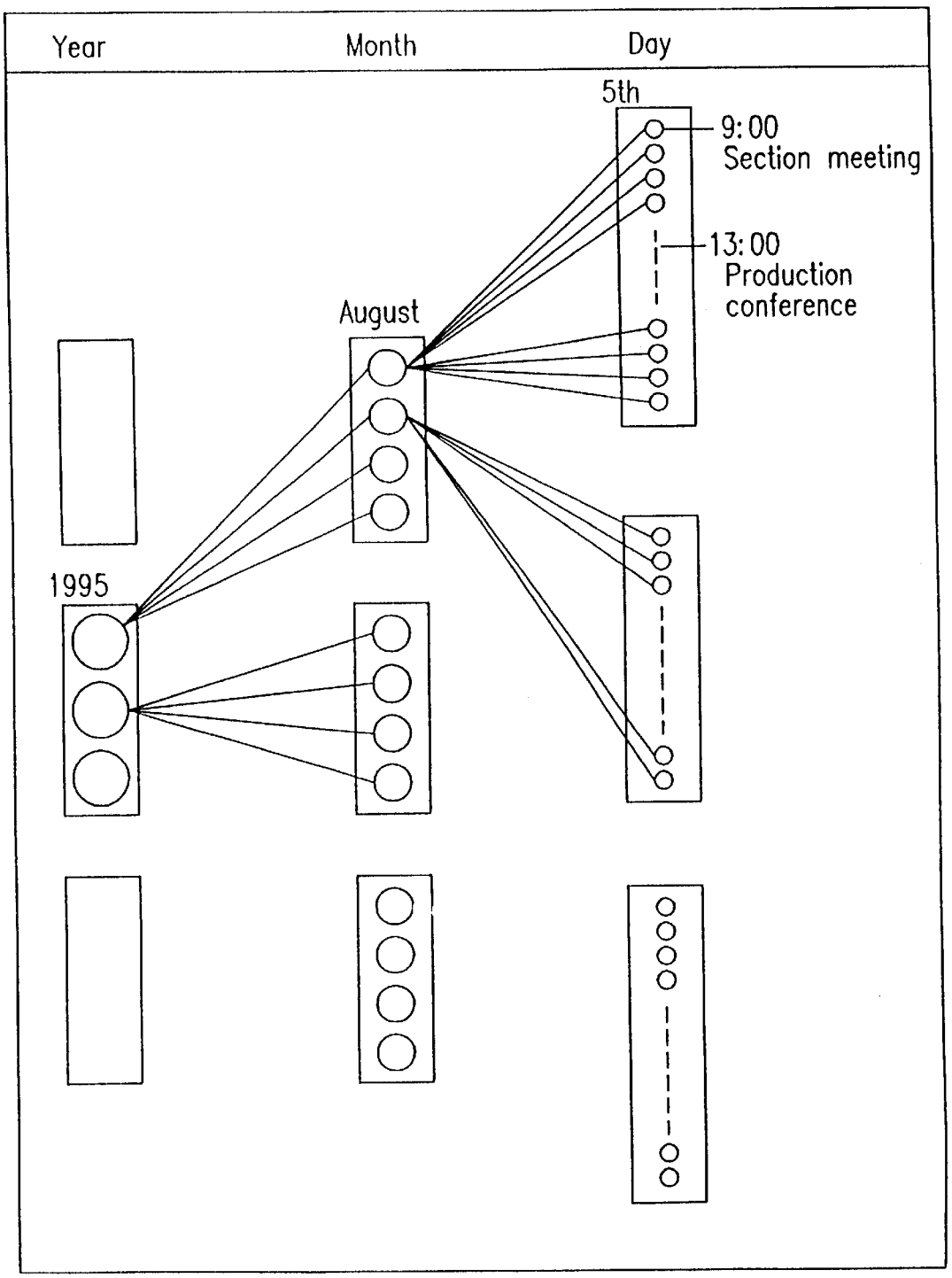
FIG. 13 illustrates a relationship among the software objects retained in an information processing apparatus.
Figure 14:
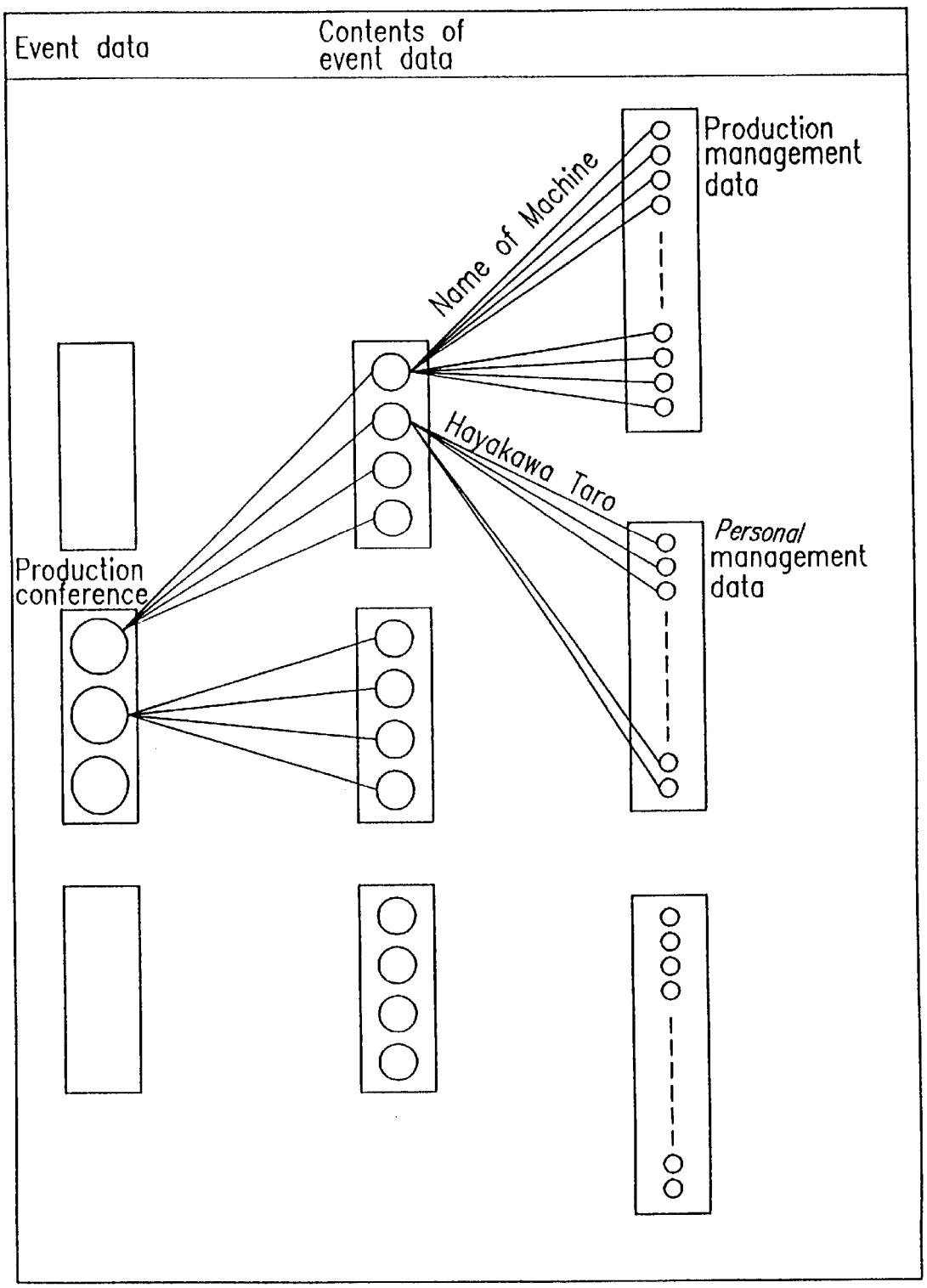
FIG. 14 illustrates a relationship among the software objects retained in an information processing apparatus.

FIGS. 13 and 14 illustrate the concept of the method of this invention for displaying a plurality of display images stored in the software objects.

First, at least one of a plurality of display images is displayed within a display window of the information processing apparatus. Next, an image indicator such as a cursor is moved to the display image (e.g., a display image representing an annual calendar or "Months" of the year as shown in FIG. 3), which is regarded as a first display image. Then, the size of a first region in which the first display image is displayed is magnified. At the same time, the size of a second region, in which a second display image associated with the first display image can be displayed, is also magnified. In the example shown in FIG. 13, the region in which the display image representing "Months" is displayed and the region in which the display image representing "Days" corresponding to each of the months is to be displayed are magnified in association with each other. At this point in time, the second display image, i.e., the display image representing "Days", has not been displayed yet. When the size of the second region reaches a predetermined value, the second display image, which has not been displayed yet, comes to be displayed correspondingly. A display image having a predetermined relationship with the first display image is searched for and selected as the second display image from a plurality of display images which have not heretofore been displayed.

Next, if a cursor is moved to the second display image this time and the size of the second region is continuously magnified in the same way, then a third display image which is associated with the second display image and has not heretofore been displayed is newly displayed. In the example shown in FIG. 13, if the region in which the display image representing "Days" is continuously magnified, then a region in which a display image representing the event schedule corresponding to each of the "Days" is to be displayed is magnified in association with the magnification. Then, a display image representing the event schedule is displayed at a predetermined time. The region in which the third display image newly appears is determined by the relationship between the second display image and the third display image. If a similar operation is further performed with respect to the third display image, a fourth display image having a predetermined relationship with the third display image is displayed. The first, second, third and fourth display images which are associated with each other can be sequentially and successively retrieved in the above-described manner.

In accordance with the method of the present invention, by performing a magnification operation with respect to a display image which has already been displayed, a plurality of display images associated with the display image can be sequentially and successively searched for and displayed.

Hereinafter, the present invention will be described as being applied to a case where schedule management is performed on a display screen of a personal computer.

Figure 1:
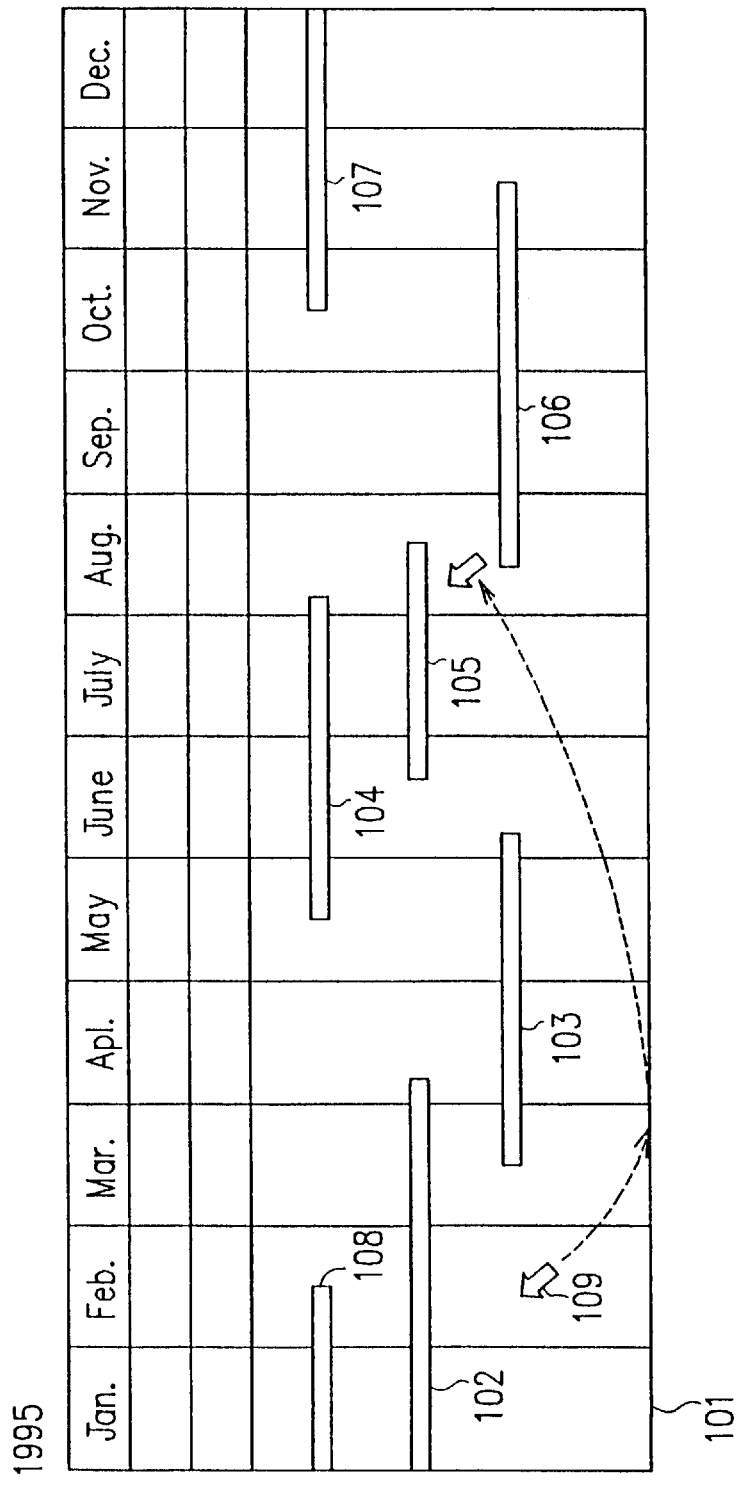
FIG. 1 illustrates exemplary display images displayed within a display window when the present invention is applied to schedule management.

An exemplary annual schedule table to be displayed on the display screen is illustrated in FIG. 1. This schedule table is displayed within a display window 101. In this schedule table, three types of display images corresponding to "Months", "Days" and "Days of the Week" (i.e., the three types of data components of the calendar) are displayed on the first to the third rows, respectively, while display images corresponding to schedule bars are displayed in the region below the third row. In FIG. 1, only the display image representing "Months" is displayed on the first row and the display images representing "Days" and "Days of the Week" to be displayed on the second and the third rows, respectively, are not displayed but hidden. A state where seven projects A to G represented by the schedule bars 102 to 108 are present during a period between January and December is shown in FIG. 1. The respectively different projects can be visually identified based on the colors of the schedule bars. For example, the bar 102 is colored in red, the bar 103 is colored in blue, the bar 104 is colored in yellow, the bar 105 is colored in green, the bar 106 is colored in orange, the bar 107 is colored in purple and the bar 108 is colored in white. In this example, a cursor 109 is used as an image indicator indicating a point within the display window 101. The cursor 109 is manipulated by a pointing device such as a mouse.

As shown in FIG. 1, on the stage where a schedule is roughly represented as an annual schedule, it is possible to know whether or not projects are present but it is impossible to specify the names of the projects corresponding to the schedule bars or the dates on which the respective events, such as conferences concerning a project, take place. In addition, since a plurality of events are possibly overlapped on the schedule table, the individual events are not specifically displayed but only the bars corresponding to the respective projects are displayed in FIG. 1.

In order to know an event of a project which is to be held on a particular day from such an annual schedule table, a method for zooming in the entire display window by using an image indicator is employed. First, the cursor 109 is moved to a location, which appears to correspond to the particular day, on the schedule bar corresponding to the project. In the example shown in FIG. 1, the cursor 109 which was positioned at a location corresponding to the middle of February is moved to the vicinity of August 5 on the schedule bar 105 representing the project D. After the cursor 109 has been moved to the location, if the cursor 109 is dragged to the right (or moved vertically or horizontally) on the display screen while clicking (or switching on) the mouse, for example, the region selected by the dragging is enlarged, so that the magnification powers of the region in which a display image has already been displayed and the regions in which display images can be displayed within the display window 101 go on increasing.

Figure 2:
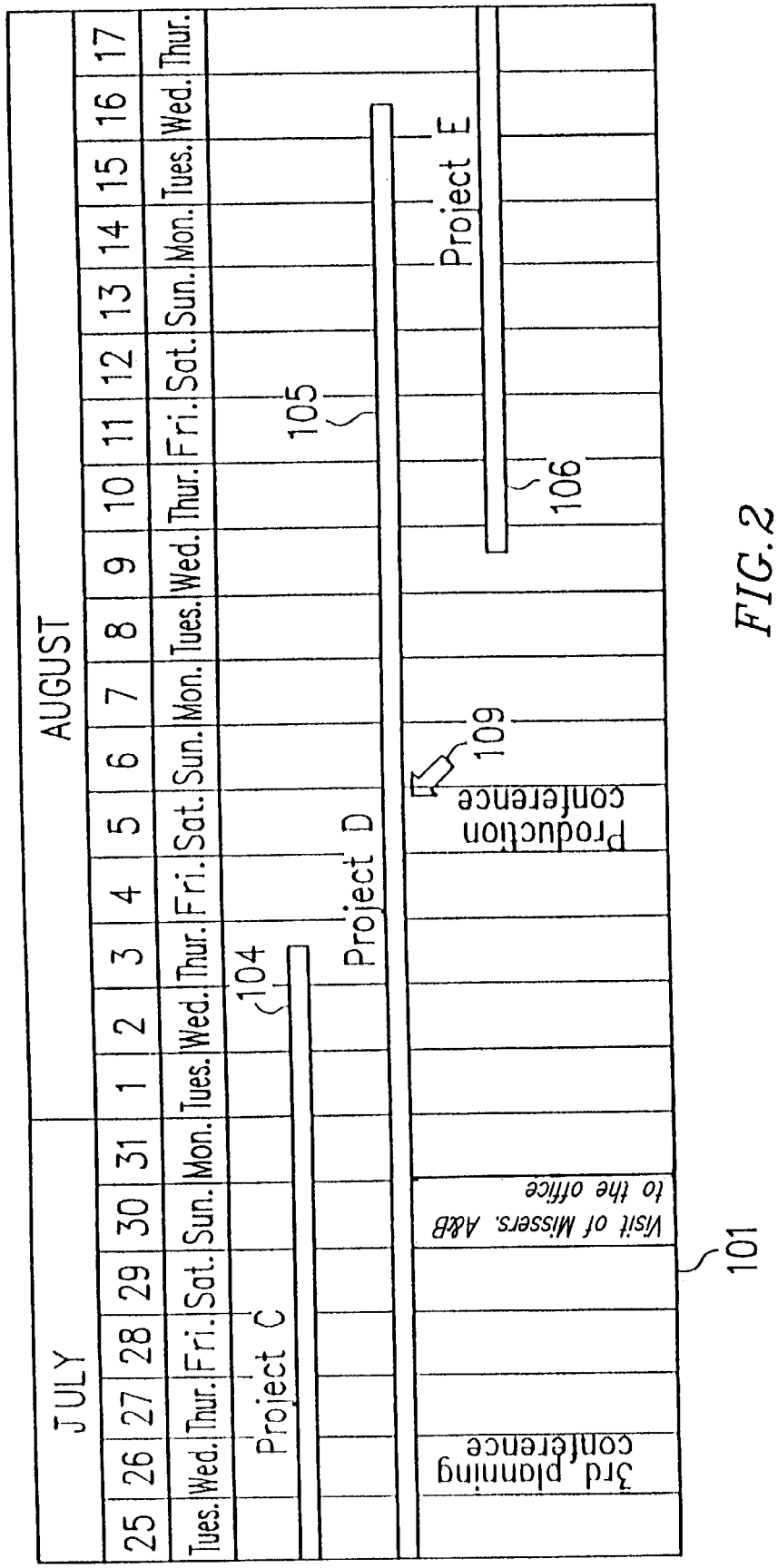
FIG. 2 illustrates exemplary display images when an image displayed within the display window as shown in FIG. 1 has been enlarged.

FIG. 2 illustrates display images displayed within the display window 101 in the middle of the zoom-in operation. The degree of the zoom-in operation or the magnification power is varied depending upon how long the cursor 109 has been dragged to the right. If the length is short, the magnification power increases less. On the other hand, if the length is long, the magnification power increases more. A schedule table ranging from July 25 to August 17 has been magnified to be displayed around August 5 indicated by the cursor 109 in FIG. 2. In FIG. 2, the display images representing "Days" and "Days of the Week" which were hidden when the magnification power of FIG. 1 was selected have appeared. In addition, the name of the project (e.g., Project D) corresponding to the bar 105 indicated by the cursor 109, one of the display images which were not displayed in FIG. 1, has also appeared.

Hereinafter, the times at which the display images, which were not displayed but hidden before the zoom-in, are displayed within the display window 101 will be described.

If the first to the third rows of the schedule table and the region for displaying the schedule bars therein are continuously magnified in the lateral direction by means of the zoom-in operation, the sizes of the second and the third rows of the calendar become large enough to display the display images representing "Days" and "Days of the Week". Then, display images representing "Days" and "Days of the Week" are correspondingly displayed on the second and the third rows of the calendar. More specifically, in the case where the display screen is controlled by a display controller having a character font file in which a character font to be displayed on the display screen is composed of 16 bits, 17 bits are required for displaying a display image representing "Days" or "Days of the Week" and ruled lines each of which is composed of 1 bit either on the second row or on the third row. At a point in time when the sizes of the second and the third rows of the schedule table become large enough to enable a 17-bit display as a result of the magnification, the display images representing "Days" and "Days of the Week" are automatically displayed within the display window 101.

As to the name of the project, the same operation is performed. Specifically, at a point in time when the length of a schedule bar indicated by the cursor 109 has the same bit length as the length of a display image representing the name of the project as a result of the magnification, the name of the project is automatically displayed correspondingly.

Moreover, as shown in FIG. 2, according to the present invention, the display images which come to be displayed by way of the zoom-in operation, i.e., the display images representing "Days" and "Days of the Week" or the display images representing the names of the projects, are not displayed at arbitrary locations within the display window 101 but at respectively prescribed locations in the vicinity of the display images which were already displayed within the display window 101 before the zoom-in operation, i.e., the display image representing "Months" or the schedule bars. The display locations are determined based on the relationship among the display image representing "Months" and the display images representing "Days" and "Days of the Week" and the relationship between a schedule bar and the display image representing the name of the project corresponding to the schedule bar. The relationship among the display images has been determined beforehand and stored in the personal computer, as will be described in detail later.

Furthermore, the zoom-in operation allows display images representing the event schedules, such as schedules of conferences or appointments, concerned with the project of interest to be displayed, in addition to the display images representing "Days" and "Days of the Week" and the display images representing the names of the projects. However, all the display images representing the event schedules concerned with the project of interest are not displayed but the schedules of several events S96324 having higher importance or priority are preferentially displayed. That is to say, the time at which the display image representing an event is displayed is determined depending upon the size and the importance of the region in which the display image representing the event is displayed.

In FIG. 2, the display images representing the schedules of the three events having the highest importance, namely "The Third Planning Conference", "Visit of Messrs. A and B to the Office" and "Production Conference" of the remarked project D are displayed, whereas the display images representing the other events having a lower importance are hidden. The importance can be represented, for example, by a positive integer N. When N=1, the highest importance is represented. The larger the N value becomes, the lower the importance thereof becomes. The N values are determined beforehand as attribute information with respect to the respective event schedules and are retained in a personal computer together with other data concerned with the event schedules. The structure of the retained data will be described in detail later.

When the cursor 109 is further dragged to a large extent to the right around the region corresponding to August 5 in the state shown in FIG. 2, the regions in which display images representing event schedules can be displayed are further magnified, so that the remaining event schedules having a lower importance and relating to the project D represented by the schedule bar 105 indicated by the cursor 109 are automatically displayed.

If the cursor 109 indicating the schedule bar 105 is further dragged to the right, then a zoom-in operation is performed, so that the widths of the display regions for displaying "Days" and "Days of the Week" on the second and the third rows of the schedule table within the display window 101 are increased. At this point in time, as shown in FIG. 3, the region corresponding to the day indicated by the cursor 109 as well as the regions in which the event schedules are displayed is magnified to be larger than the regions corresponding to the other days. When the region corresponding to the day indicated by the cursor 109 has been magnified to have a width M times as large as the width of a region in which only a display image representing an event schedule having the highest importance can be displayed, a display image representing a time schedule is displayed. FIG. 3 shows the state where the region corresponding to August 5 in which the cursor 109 is located has been magnified so as to have a size six (M=6) times as large as that of a region in which only an event schedule having the highest importance can be displayed. A time schedule is stored in a separate data file from the file in which schedule bars are stored and includes some events which have nothing to do with the schedule bar indicated by the cursor 109. Thus, only the events associated with the schedule bar have been sorted on the time axis so as to be displayed.

As shown in FIG. 3, the zoom-in operation is performed such that the magnification power of the region corresponding to the day indicated by the cursor 109 (hereinafter, such a region will be simply referred to as a "currently indicated region") becomes largest and that the more distant a region becomes from the currently indicated region, the smaller the magnification power of the former region becomes. In the example shown in FIG. 3, the sizes of the two regions which correspond to August 1 and August 8 and are most distant from the region corresponding to August 5 remain the size of a region in which only a display image representing an event schedule having the highest importance can be displayed (hereinafter, these regions will be referred to as "smallest regions"). However, the other regions have been magnified so as to be twice, three times, four times the size of the smallest regions. As described above, the region corresponding to August 5 has been magnified to be six times the size of the smallest regions.

As a result of such a magnification, a display image representing an event schedule "Patent Promotion Conference", which was not displayed in the state shown in FIG. 2 because of the lower importance thereof, has appeared in the region corresponding to August 2. As described above, only an event schedule "Production Conference" was displayed in the region corresponding to August 5 before the magnification (or in the state shown in FIG. 2). However, as a result of the magnification, a display image representing an event schedule "Sale Conference" having a lower importance has also appeared. Furthermore, a display image representing a time schedule including all the events to be held on August 5 has also appeared as described above. The time schedule includes not only the events concerned with the project D but also a regularly held event "Section Meeting" and an event concerned with another project "Meeting Mr. A". Thus, the display image representing the time schedule provides a bird's-eye view of the entire schedule to be held on August 5.

As described above, in the case of applying the present invention to schedule management on a personal computer, the display regions are successively magnified around a remarked project or a remarked day on the schedule table, whereby more detailed schedules can be automatically retrieved. In addition, according to the present invention, other specific data concerned with each event (e.g., the attendees at the event "Production Conference", the place of meeting in which the event is to be held and the name of a machine to be examined during the event) can also be retrieved.

In the state shown in FIG. 3, by moving the cursor 109 to the display image representing the event schedule "Production Conference" and clicking the mouse, for example, the event schedule "Production Conference" is selected. Next, if the cursor 109 is dragged to the right, a box-shaped display image representing the contents of the event "Production Conference" is displayed as shown in FIG. 4. In the example shown in FIG. 4, data representing the date and the time when the production conference is to be held; the place where the conference is to be held; the attendees at the conference; and the name of the machine to be examined at the conference are displayed. The data representing the attendees have been displayed as a result of the search through employees' database which was performed simultaneously with the dragging of the mouse. Among the attendees, "Kimura Saburo" is not a member belonging to the office and he could not be found as a result of the search through the employees' database. Thus, a mark "*" is displayed to be attached to his name.

Figure 5:
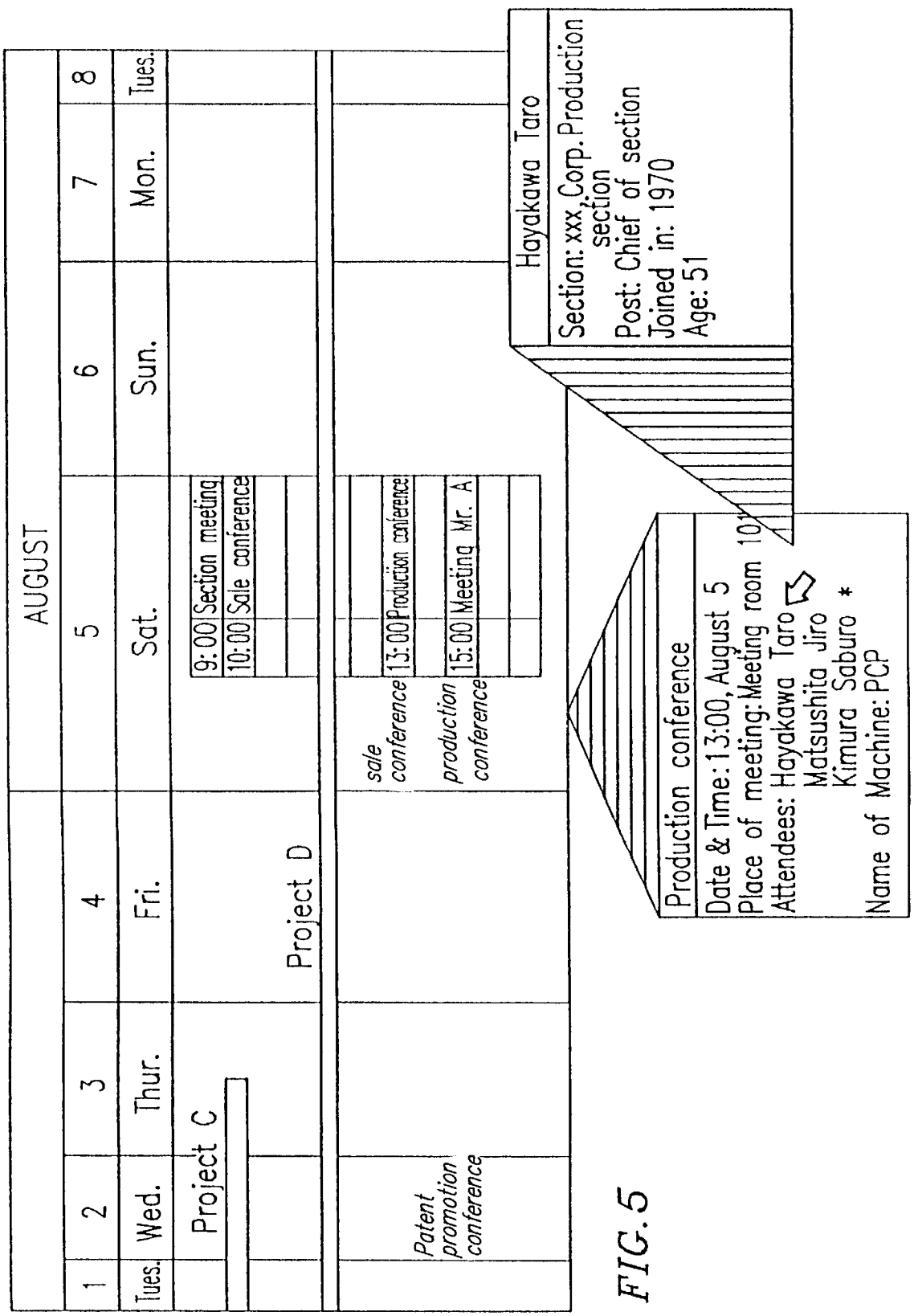
FIG. 5 illustrates exemplary display images when one of the data items, contained in the display image representing the contents of an event as shown in FIG. 4, is remarked and enlarged.

If the cursor 109 is moved to the location of the employee "Hayakawa Taro" while keeping the mouse clicked and the cursor 109 is further dragged to the right, a box representing the employee's data of "Hayakawa Taro" is displayed as shown in FIG. 5. In order to return to the box of the production conference, it is necessary to move the cursor 109 to the required location on the screen. However, if the mouse is clicked and the cursor 109 is dragged to the left, then a zoom-out operation is performed and the box representing the employee's data of "Hayakawa Taro" disappears. If the cursor 109 is further dragged to the left, the box representing the contents of the event "Production Conference" also disappears.

When the cursor 109 is further dragged to the left in this state, the zoom-out operation starts, so that the display image within the display window 101 turns into the state shown in FIG. 3, the state shown in FIG. 2, and the state shown in FIG. 1 or the annual schedule table at last. During this zoom-out operation, the display image representing the time schedule, the display images representing the event schedules, and the display images representing "Days" and "Days of the Week" are successively erased in the reverse order to the order during the zoom-in operation. The erasure is performed with the same timing as the timing at which these display images appear as a result of the zoom-in operation. More specifically, in this example, the display images representing "Days" and "Days of the Week" are erased when the sizes of the regions on the second and the third rows of the calendar become smaller than 17 bits.

Figure 6:
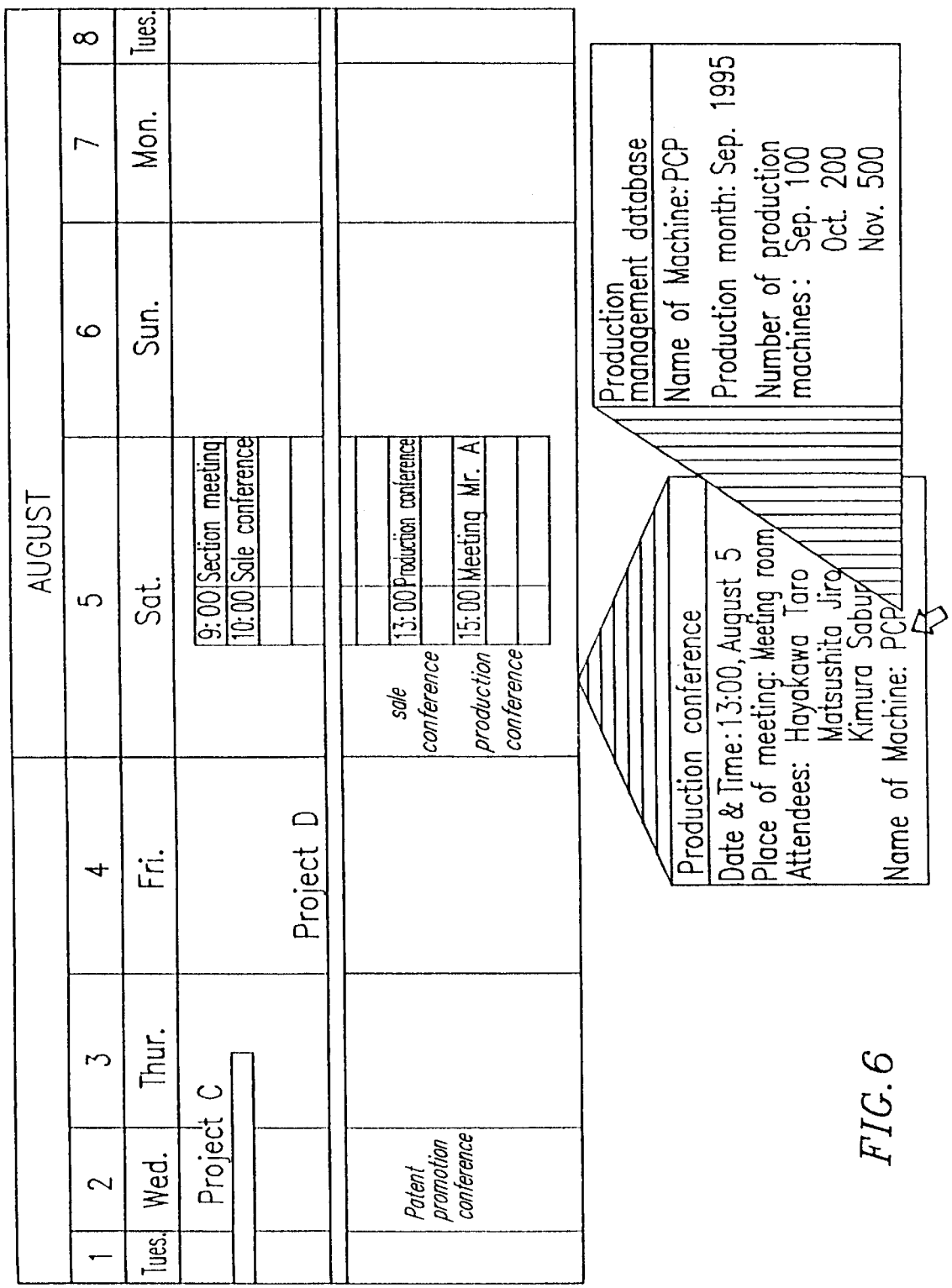
FIG. 6 illustrates exemplary display images when another data item, contained in the display image representing the contents of an event as shown in FIG. 4, is remarked and enlarged.

In the state shown in FIG. 4, if the cursor 109 is moved to the location of the "name of the machine for discussion: PCP" within the box representing the contents of the production conference; the mouse is clicked; and the cursor 109 is dragged to the right for preparing for the production conference, access is automatically gained to the production management database which is managed on any other computer through the communication line, so that a box representing the data of the production of the machine PCP for discussion is displayed. In the example shown in FIG. 6, while the box is kept open, the name of the machine; the month on which the machine was first produced; and the number of the machines which were produced on these months are displayed.

Figure 7:
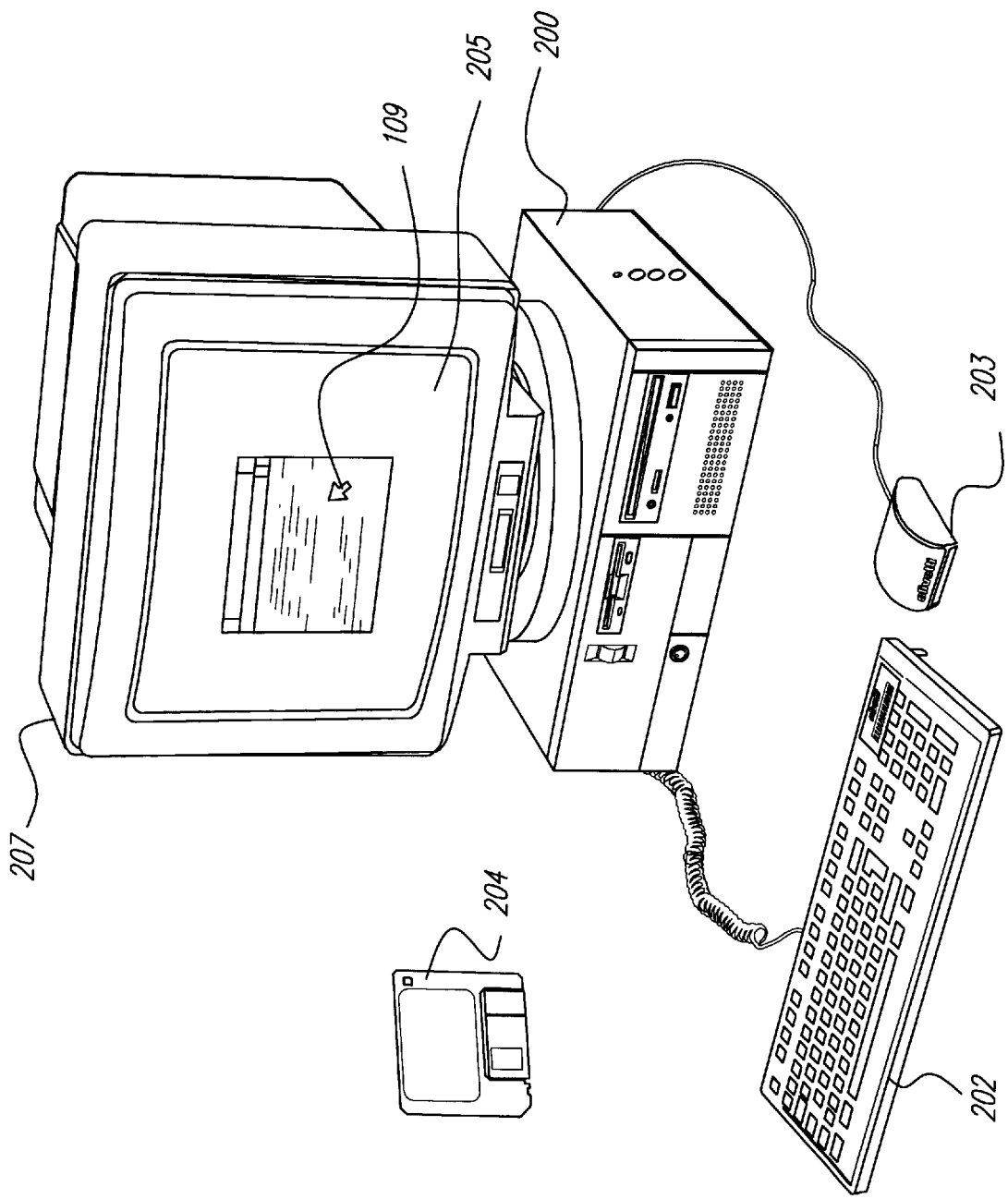
FIG. 7 is a perspective view showing an external configuration of a personal computer.
Figure 8:
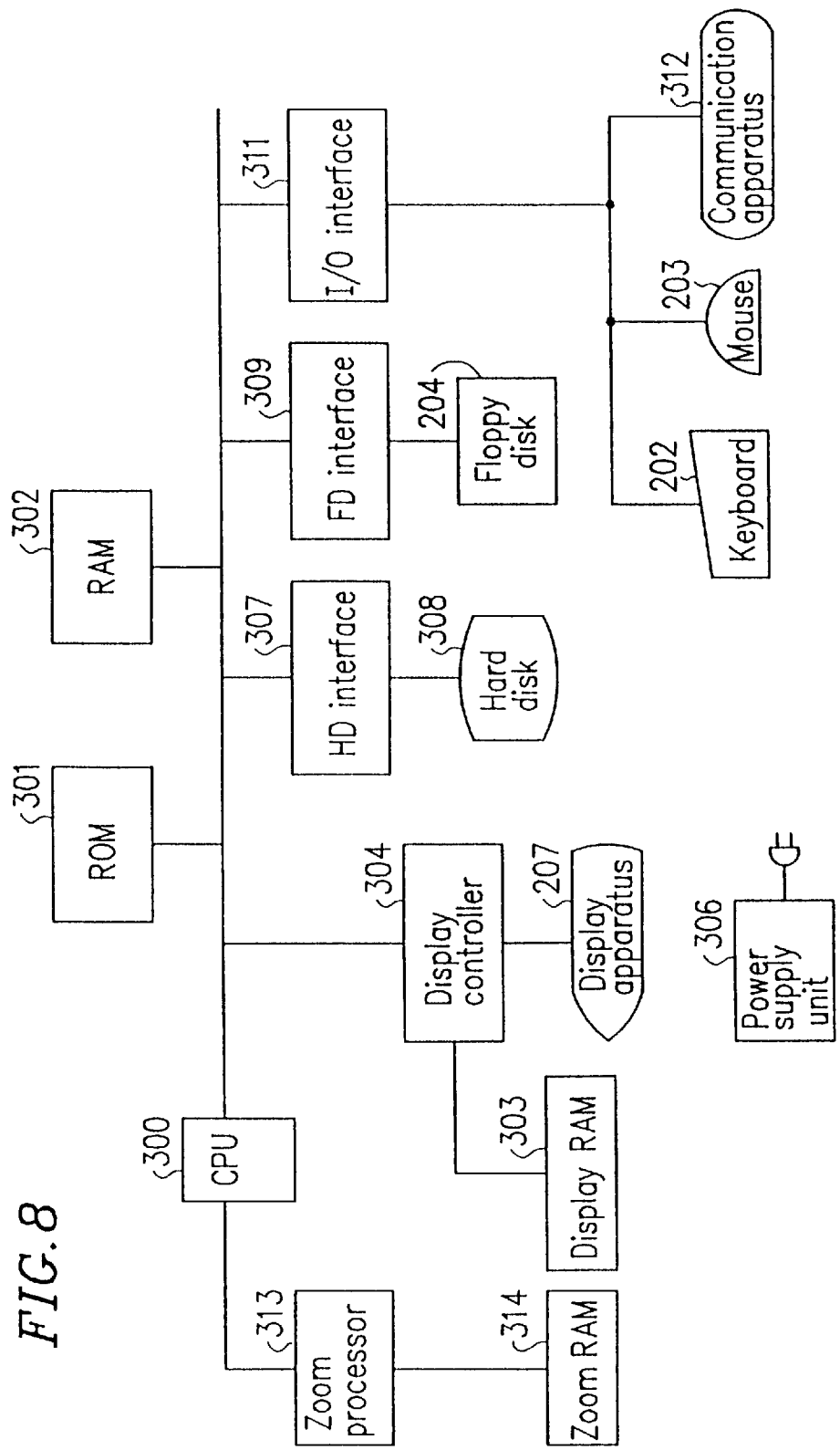
FIG. 8 is a block diagram showing a system configuration of a personal computer when the present invention is applied to schedule management using the personal computer.

An exemplary external configuration of a personal computer is shown in FIG. 7 and an exemplary system configuration of the computer system to which the present invention is applicable is shown in FIG. 8. As shown in FIG. 7, a personal computer includes: a data processing apparatus 200; a keyboard 202; a mouse 203 functioning as a pointing device; a display apparatus 207; and a power supply unit 306. A display window 101 is displayed on a display screen 205 of the display apparatus 207 and a plurality of display images are displayed within the display window 101 in the above-described manner. As shown in FIG. 8, the data processing apparatus 200 includes: a CPU 300 functioning as a system controller; a ROM 301 and a RAM 302 functioning as storage media for storing a plurality of software objects therein; and a display RAM 303, a display controller 304, a zoom processor 313 and a zoom RAM 314 for displaying the display images onto the display apparatus 107 and magnifying and shrinking the display images. The data processing apparatus 200 can also receive software objects through interfaces 307, 309 and 311 from the storage media other than the ROM 301 and the RAM 302, such as a hard disk 308, a floppy disk 204 and an external storage media. The communication between the data processing apparatus 200 and an external storage media is performed through a communication apparatus 312 connected to the personal computer via an I/O interface 311.

FIGS. 9A to 9C and FIGS. 10A and 10B illustrate the structures of the data retained as software objects. In this example, four types of data, i.e., project data, event schedule data, event data and personal information management data, are used and stored in the RAM 302 shown in FIG. 8. The production management data is stored in a RAM of another information processing apparatus.

Hereinafter, the structures of the respective data will be described with reference to FIGS. 9A to 9C and FIGS. 10A and 10B.

FIG. 9A illustrates the structure of the project data. The project data is a data set consisting of: data attributes representing the type of the data; a project data number used for identifying the individual project data; a name of the project, one of the display images which can be displayed; and data representing the start date and the end date of the project. The project data number is represented by 3 decimal digits ranging from "000" to "999", while the name of the project is represented by 20 or a smaller number of characters. In FIG. 9A, the project data of the project D to which a project data number "003" is assigned are shown. A schedule bar is produced based on this project data and is displayed within the display window 101.

FIG. 9B illustrates the structure of the event schedule data. In this example, the data attribute and the data representing the date are first recorded, and then the same number of data sets as the total number of events to be held on the day are recorded. Herein, a data set consists of three kinds of data numbers (i.e., an event schedule data number assigned to each of the events to be held on the day; a project data number representing a project associated with the event; and an event data number representing other events associated with the event) and the importance of the event. The event schedule data number is also represented by 3 decimal digits ranging from "001" to "999". The contents of each event to which the data numbers are assigned are recorded as event data as shown in FIG. 9C.

The data shown in FIG. 9B is a part of the event schedule data corresponding to Aug. 5, 1995. In FIG. 9B, the event to which a data number "001" is assigned has a blank project data number row. Thus, this event is not associated with any project. On the other hand, since the event to which a data number "003" is assigned has a project data number "003", it is understood that the event is associated with the project D.

The actual contents of an event are recorded as the event data shown in FIG. 9C. The event data consists of: the attribute of the event data; the data number of the event; the kind of the event; the start time of the event; the name of the event; the place where the event is to be held; the name of an attendee; the code of the attendee; subject matter information; the attribute of the data associated with the event; and the individual code of the associated data. The data number can be represented by 4 decimal digits ranging from "0000" to "9999". The kind of the event is represented, for example, as "1" when the event is a conference or as "2" when the event is an appointment. The name of the event is a display image which can be displayed depending upon the importance of the event. FIGS. 10A and 10B illustrate exemplary structures of personal information management data and production management data.

As is understood from the data structures shown in FIGS. 9A to 9C, the name of an event is associated with the schedule bar of a project associated therewith via the project data number recorded as the event schedule data (FIG. 9B) of the event. The relationship among the display images has been recorded beforehand as data in such a manner, and each display image is displayed at a location determined based on the data.

Table 1 shows a relationship among the display images recorded in the respective data and the timing with which these images are displayed by performing a zoom-in operation in this example.

TABLE 1

Relationship between data structure and zooming processing

| Zooming size | Project data | Event schedule data | Event data | Personal information management data | Production management data |
|---|---|---|---|---|---|
| Annual calendar | Displaying schedule bars | — | — | — | — |
| "days" & "days of the week" can be displayed | Displaying names of projects | Referring to event data having highest importance (N = 1) | Displaying event data which is reffered to | — | — |
| Larger | Same | Referring to event data having lower importance | Displaying event data which is reffered to | — | — |
| 6 times as large as the width of display region | Same | Referring to event data corresponding to a Day indicated by cursor | Displaying event data which is reffered to | — | — |
| Zooming in event data (1/N of entire display) | Same | Same | Displaying all event data | — | — |
| Zooming in individual data | Same | Same | Same | Searching for ID codes and displaying required information | — |
| Zooming in individual data | Same | Same | Same | — | Searching for ID codes and displaying required information |

In a state where the display magnification power within the display window is small and the display images representing "Days" and "Days of the Week" have not been displayed yet, i.e., in a state where the annual calendar is displayed (FIG. 1), schedule bars, each of which is drawn between the start date and the end date of a project which are recorded in the project data, are displayed as display images. At this point in time, the data recorded as the event schedule data, the event data, the personal information management data and the production management data are not displayed.

When the second and the third rows of the calendar have been magnified so as to be large enough to display the display images representing "Days" and "Days of the Week" thereon as a result of the zoom-in operation, the names of the projects recorded in the project data are displayed for the first time. At the same time, event schedule data having the highest importance (N=1) is searched for among all the event schedule data. When the event schedule data in question is found, reference is made to the corresponding event data and the name of the event recorded therein is displayed as a display image at a predetermined location within the display window.

As the magnification power used for the zoom-in operation is increased, the names of the events having a lower importance are also displayed. When the region corresponding to the day indicated by the cursor or the day of interest becomes six times (M=6) the size of a region in which only the name of an event having the importance N=1 can be displayed as a result of the zoom-in operation, access is made to the event schedule data of the day of interest; reference is made to the event data based on the event data number recorded in the event schedule data; and the start time and the name of the event which are recorded in the event data are displayed as a time schedule.

Next, when the cursor is moved to the display image representing the "event" within the display window and the image is further magnified, a display image representing all the contents of the event of interest is displayed.

Subsequently, when one of the items displayed as the contents of the event is selected and magnified, data corresponding to the item are searched for through the database. If the corresponding data is found, then the required display image is displayed. For example, in the case where one of the "names of the attendees at the event" is selected and magnified, the code of the remarked attendee is searched for through the personal information management data file. When the code is found, the data of the attendee in question, i.e., the name, the section, the post and the age of the attendee as shown in FIG. 10A, is displayed as a display image.

Figure 11:
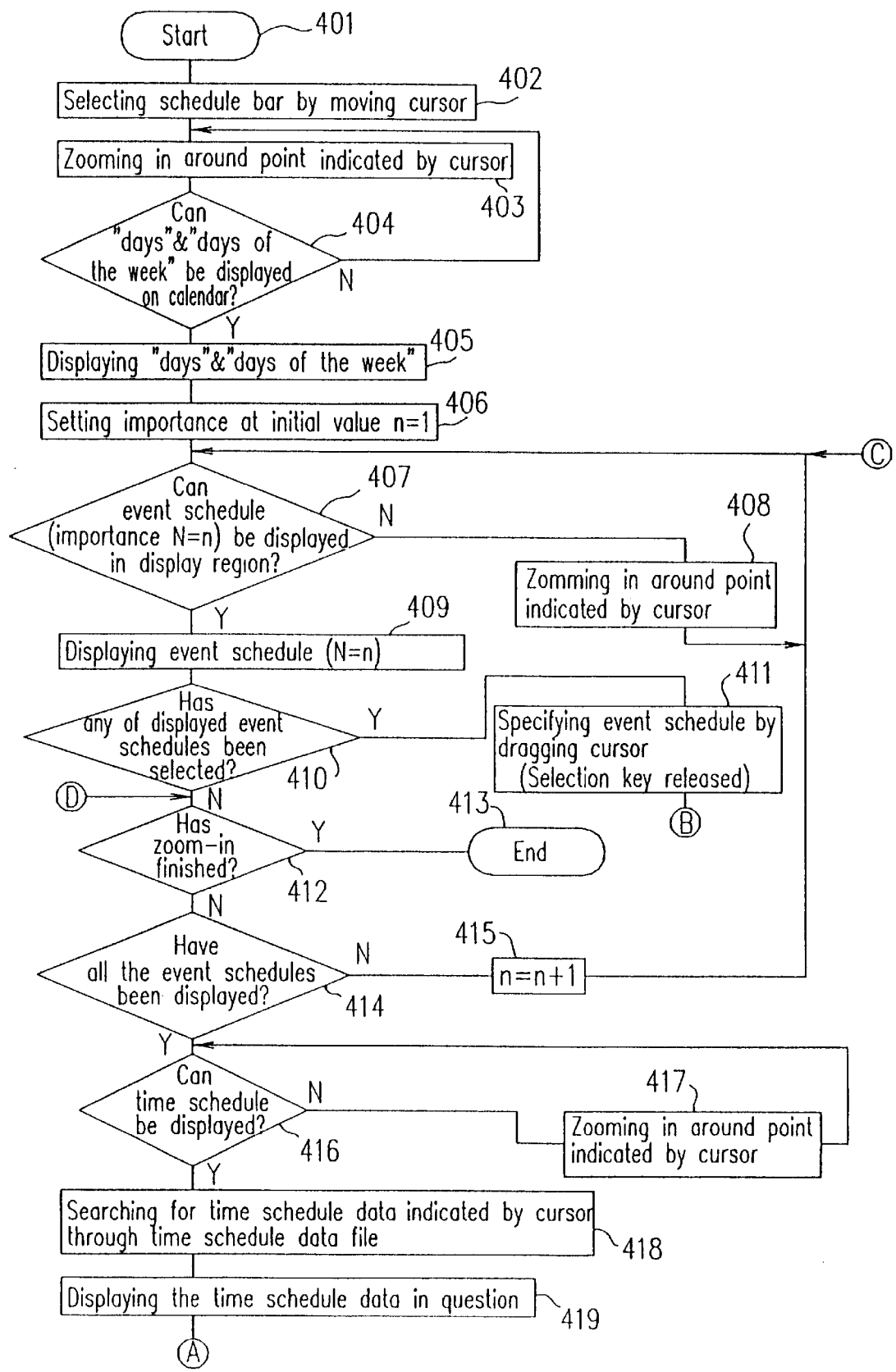
FIG. 11 is a flowchart showing a process flow when the present invention is applied to schedule management.
Figure 12:
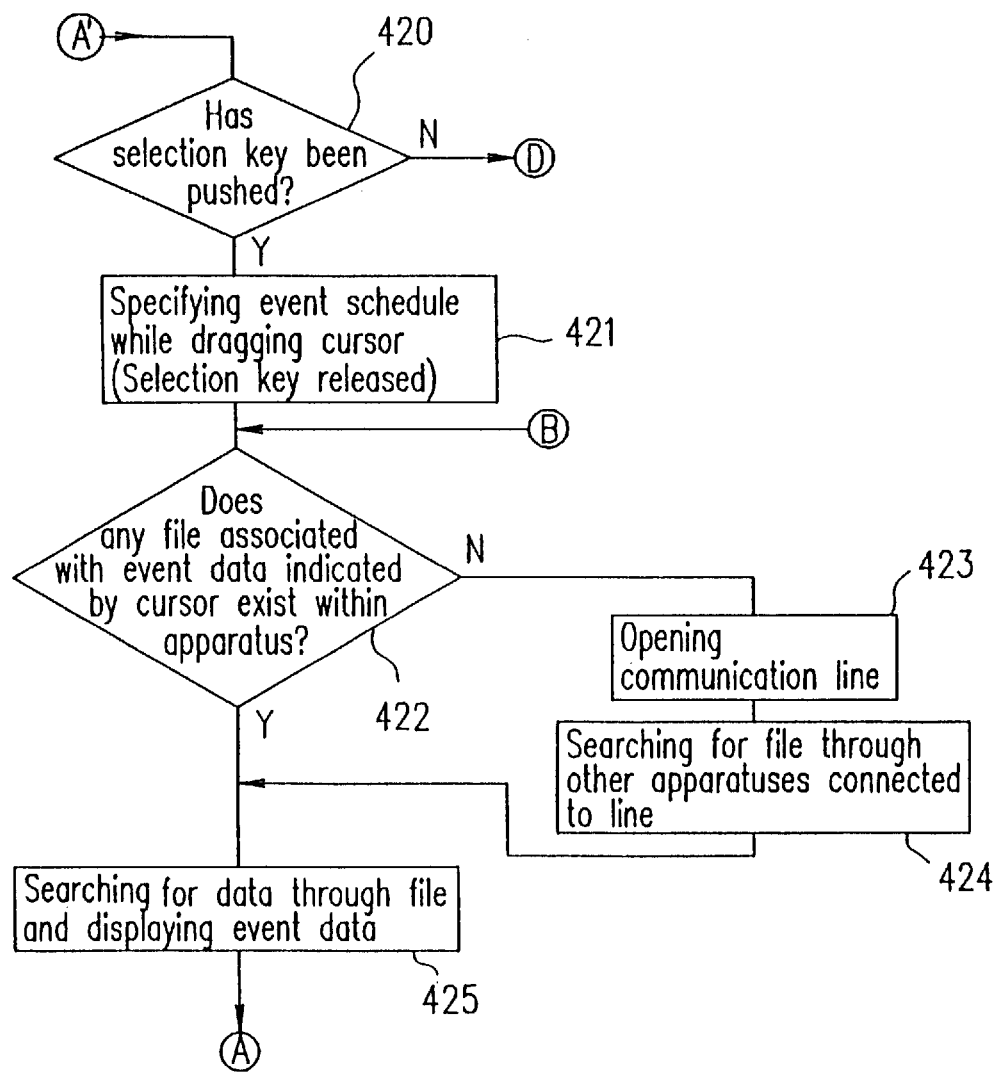
FIG. 12 is a flowchart showing the process flow following the process flow shown in FIG. 11 when the present invention is applied to schedule management.

FIGS. 11 and 12 are flowcharts illustrating the instructions from the computer, the specifications of the user and the flow of the operations performed within the computer during the schedule management. The processing illustrated in these flowcharts is performed under the control of the CPU 300 shown in FIG. 8.

In Step 401, the annual calendar shown in FIG. 1 is displayed and the processing starts. On the annual calendar shown in FIG. 1, a schedule bar of interest is selected by moving a cursor (Step 402) and the display image displayed within the display window is magnified around a point on the selected schedule bar (Step 403). In Step 404, the sizes of the second and the third rows of the schedule table are checked to determine whether or not the sizes are large enough to display the display images representing "Days" and "Days of the Week", respectively. If it is determined that the sizes of the regions for displaying "Days" and "Days of the Week" therein have become equal to or larger than the size of the character font in Step 404, then the display images representing "Days" and "Days of the Week" are displayed (Step 405).

Next, the processing proceeds to the steps for magnifying the region in which the schedule bar is displayed and displaying the event schedules following the order of the importance thereof. First, at Step 406, the importance is set to be an initial value n=1 and a search operation is performed among all the event schedule data having a structure shown in FIG. 9B. At Step 407, the size of the region in which the event schedule is to be displayed is checked. If the size is not so large as to display an event schedule having the highest importance (N=1), then the region is zoomed in around the point indicated by the cursor (Step 408). If the size is large enough to display the event schedule, the event schedule having the importance N=1 is displayed (Step 409).

Next, it is confirmed whether or not any of the displayed event schedules has been selected (Step 410). If any of the displayed event schedules has been selected, then the processing for magnifying the region in which the schedule bar is displayed is suspended and the processing proceeds to the steps for magnifying the region in which the selected event schedule is displayed by dragging the region while using the cursor (Step 411). The selection is performed, for example, by clicking the cursor or by input through a particular key on the keyboard.

On the other hand, if the selection key has not been pushed yet, it is confirmed whether or not the magnification of the region in which the schedule bar is displayed has been finished in Step 412. If the magnification has not been finished yet, it is checked whether or not all the event schedules associated with the remarked schedule bar have been displayed (Step 414). If there is any event schedule which has not been displayed yet, the value of the importance is incremented by one (Step 415) so as to return to Step 407.

On the other hand, if all the event schedules associated with the schedule bar of interest have already been displayed, then the region corresponding to the day of interest is monitored to determine whether or not the size of the region has become large enough to display a time schedule (Step 416). If the size has not become so large, the region is continuously magnified around the day indicated by the cursor (Step 417). When it is possible to display the time schedule, data representing the time schedule of the day indicated by the cursor is searched for through all the time schedule data file (Step 418). When the file in question is found, the data representing the time schedule is displayed (Step 419).

In Steps 420 and 421, it is confirmed whether or not any of the displayed event schedules has been selected. If any of the displayed event schedules has been selected, then the processing for magnifying the region in which the schedule bar is displayed is suspended and the processing proceeds to the steps for magnifying the region in which the selected event schedule is displayed by dragging the region while using the cursor in the same way as in Steps 410 and 411. First, at Step 422, it is checked whether or not a file associated with the event data indicated by the cursor exists in the apparatus. If there is any associated file, the data in question is searched for through the file and a display image recorded in the data is displayed (Step 425). If there is no associated file, a communication line is opened for searching for the file through other apparatuses, thereby searching for the file through other apparatuses to which the line is connected (Steps 423 and 424). Thereafter, a required display image is retrieved from the required file so as to be displayed (Step 425).

As is apparent from the foregoing description, according to the present invention, simply by performing a magnification operation with respect to a display image which has already been displayed, all the other display images associated with the display image can be sequentially displayed within the display window of an information processing apparatus. Thus, it is not necessary to perform an operation for specifying a display image to be displayed next time every time a single display image is displayed. Consequently, it is possible to smoothly and successively retrieve a plurality of mutually associated display images.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed. S96324

What is claimed is:

1. A method for displaying a plurality of display images associated with hierarchical data, which are stored in a plurality of software objects, within a display window of an information processing apparatus in which the plurality of software objects are stored, comprising:

a first step of selectively displaying a first display image from the plurality of display images in a first region within the display window; and a second step of selectively displaying a second display image from the plurality of display images in a second region within the display window, the second region being at a different location in the display window from the first region, wherein the second step comprises the steps of:

indicating a point within image display regions including the first region and the second region, in which the plurality of display images are to be displayed using an image indicator indicating a point within the display window;

changing a magnification power at which the first display image is displayed by moving a distance the image indicator from the indicated point within the image display regions, thereby changing sizes of the first region and the second region; and displaying the second display image when the size of the second region has increased to reach a predetermined size.

2. A method according to claim 1, further comprising a step of erasing the second display image when the size of the second region has decreased to reach a predetermined size.

3. A method according to claim 1, wherein the information processing apparatus further stores a flag representing an importance of each of the plurality of display images therein, and wherein the step of displaying the second display image further comprises the steps of:

making a reference to the flags of display images which are not displayed within the display window among the plurality of display images; and selecting a display image having a higher importance from the display images which are not displayed by giving a priority to the display image over the other display images having a lower importance based on a result of the reference.

4. A method according to claim 1, wherein the first display image is a representation representing a month of a year, and the second display image is a representation representing an event during the month represented by the first display image, and wherein the step of displaying the second display image further comprises a step of searching for the second display image among the plurality of display images.

5. A method according to claim 1, wherein the step of displaying the second display image further comprises a step of simultaneously displaying both the first display image and the second display image within the display window.

6. A method according to claim 1, wherein each of the plurality of display images is recorded in a software object corresponding thereto, and wherein the step of displaying the second display image further comprises the steps of:

searching for the second display image among all the display images recorded in a software object corresponding to the first display image; and searching for the second display image among the display images recorded in another software object when the second display image is not recorded in the software object corresponding to the first display image.

7. A method according to claim 6, wherein the information processing apparatus is connected to another information processing apparatus in which another plurality of software objects are stored, and wherein the step of displaying the second display image further comprises the steps of:

searching for the second display image among the display images corresponding to the another plurality of software objects stored in the another information processing apparatus when the second display image is not recorded in any of the plurality of software objects stored in the information processing apparatus; and transferring the second display image from the another information processing apparatus to the information processing apparatus.

8. A method according to claim 1, wherein the image indicator is moved by a pointing device.

9. A method according to claim 1, further comprising a step of displaying a third display image when the size of the second region has been further increased to be M times as large as the predetermined size.

10. A method according to claim 1, wherein the first step includes a step of selectively displaying a plurality of first display images in a plurality of first regions, and wherein the step of changing the sizes of the first region and the second region includes a step of determining the respective sizes of the plurality of first regions such that a size of one of the plurality of the first regions selected by the indicated point is larger than sizes of adjacent first regions among the plurality of first regions.

11. A method according to claim 1, wherein the step of changing a magnification power comprises:

a step of increasing the magnification power by moving the image indicator from the indicated point in a first direction, and a step of decreasing the magnification power by moving the image indicator from the indicated point in a second direction which is opposite to the first direction.

12. A method according to claim 1, wherein the image indicator moves a selected distance away from the indicated point and the magnification power being varied depending on the selected distance the image indicator is moved away from the indicated point.

13. A method according to claim 1, wherein the first image is associated with most significant hierarchical data, and the second image is associated with less significant hierarchical data.

14. A method according to claim 1, wherein the second region is a region to be determined based on a relationship between the first display image and the second display image and the relationship between the first display image and the second display image is previously recorded in a software object corresponding to the first display image or the second display image.

15. A method for sequentially displaying within a display window of an information processing apparatus a plurality of display images stored in a plurality of software objects stored in the information processing apparatus, the method comprising:

a first step of selectively displaying a first display image from the plurality of display images in a first region within the display window;

a second step of indicating a point within the displayed first display image using an image indicator indicating a point within the display window;

a third step of changing a magnification power at which the first display image is displayed by moving the image indicator a selected distance away from the indicated point within the first display image, thereby changing sizes of the first region and a second region within the display window different from the first region, the magnification power being varied according to the distance the image indicator is moved away from the indicated point; and a fourth step of selectively displaying a second display image from the plurality of display images in the second region when the second region has increased to a predetermined size, the second region in which the second image is displayed being determined using a relationship between the first display image and the second display image previously recorded in a software object corresponding to the first display image or the second display image.

16. A method for displaying a plurality of display images associated with hierarchical data, which are stored in a plurality of software objects, within a display window of an information processing apparatus ill which the plurality of software objects are stored, comprising: p1 a first step of selectively displaying a plurality of image display regions within the display window wherein a first display image from the plurality of display images is displayed in a first region of the plurality of image display regions; and a second step of selectively displaying a second display image from the plurality of display images in a second region of die plurality of image display regions, the second region being at a different location in the display window from the first region, wherein the second step comprises the steps of:

indicating a point with the plurality of image display regions using an image indicator indicating tile point;

moving the image indicator a distance from the indicated point within the plurality of image display regions, thereby changing sizes of the plurality of image display regions and a magnification power at which the first display image is displayed; and displaying the second display image when the size of the second region has increased to reach a predetermined size.

17. A method according to claim 16, wherein the first display image is a representation of at least one month of a year, and the second display image is a representation of an event during the month represented by the first display image, and wherein the step of displaying the second display image further comprises a step of searching for the second display image among the plurality of display images.

18. A method according to claim 16, wherein the step of displaying the second display image further comprises a step of simultaneously displaying both the first display image and the second display image within the display window.

19. A method according to claim 16, wherein each of the plurality of display images is recorded in a software object corresponding thereto, and wherein the step of displaying the second display image further comprises the steps of:

searching for the second display image among all the display images recorded in a software object corresponding to the first display image; and searching for the second display image among the display images recorded in another software object when the second display image is not recorded in the software object corresponding to the first display image.

20. A method according to claim 16, wherein the information processing apparatus is a first information processing apparatus connected to a second information processing apparatus in which another plurality of software objects are stored, and wherein the step of displaying the second display image further comprises the steps of:

searching for the second display image among the display images corresponding to the another plurality of software objects stored in the second information processing apparatus when the second display image is not recorded in any of the plurality of software object stored in the first information processing apparatus; and transferring the second display image from the second information processing apparatus to the first information processing apparatus.

21. A method according to claim 16, wherein the image indicator is moved by a pointing device.

22. A method according to claim 16, further comprising a step of displaying a third display image when the size of the second region has been further increased to be M times as large as the predetermined size.

23. A method according to claim 16, wherein the first step includes a step of selectively displaying a plurality of first display images in a plurality of first regions, and wherein the step of changing the sizes of the first region and the second region includes a step of determining the respective sizes of the plurality of first regions such that a size of one of he plurality of the first regions selected by the indicated point is larger than sizes of adjacent first regions among the plurality of first regions.

24. A method according to claim 16, wherein the step of changing a magnification power comprises:

a step of increasing the magnification power by moving the image indicator from the indicated point in a first direction, and a step of decreasing the magnification power by moving the image indicator from the indicated point in a second direction which is opposite to the first direction.

25. A method according to claim 1, wherein the image indicator moves a selected distance away from the indicated point and the magnification power being varied depending on the selected distance the image indicator is moved away from the indicated point.

26. A method according to claim 1, wherein the first image is associated with most significant hierarchical data, and the second image is associated with less significant hierarchical data.

27. A method according to claim 1, wherein the second region is a region to be determined based on a relationship between the first display image and the second display image aid the relationship between the first display image and the second display image is previously recorded in a software object corresponding to the first display image or the second display image.

28. A method for sequentially displaying within a display window of an information processing apparatus a plurality of display images stored in a plurality of software objects stored in the information processing apparatus, the method comprising:

a first step of selectively displaying a plurality of image display regions within the display window wherein a first display image from the plurality of display images is displayed in a first region of the plurality of image display regions;

a second step of indicating a point within, the plurality of image display regions using an image indicator indicating the point;

a third step of moving the image indicator a selected distance away from the indicated point within plurality of image display regions, thereby changing sizes of the plurality of image display regions and a magnification power at which the first display image is displayed, the magnification power being varied according to the distance the image indicator is moved away from the indicated point; and a fourth step of selectively displaying a second display image from the plurality of display images in a second region of the plurality of image display regions when the second region has increased to a predetermined size, the second region in which the second image is displayed being different from the first region and being determined using a relationship between the first display image and the second display image previously recorded in a software object corresponding to the first display image or the second display image.

* * * * *